F. C. POTTER.
CIRCUIT CLOSER FOR VEHICLE ALARMS.
APPLICATION FILED JUNE 7, 1919.

1,340,344.

Patented May 18, 1920.
2 SHEETS—SHEET 1.

Inventor
F. C. Potter

F. C. POTTER.
CIRCUIT CLOSER FOR VEHICLE ALARMS.
APPLICATION FILED JUNE 7, 1919.
1,340,344.
Patented May 18, 1920.
2 SHEETS—SHEET 2.
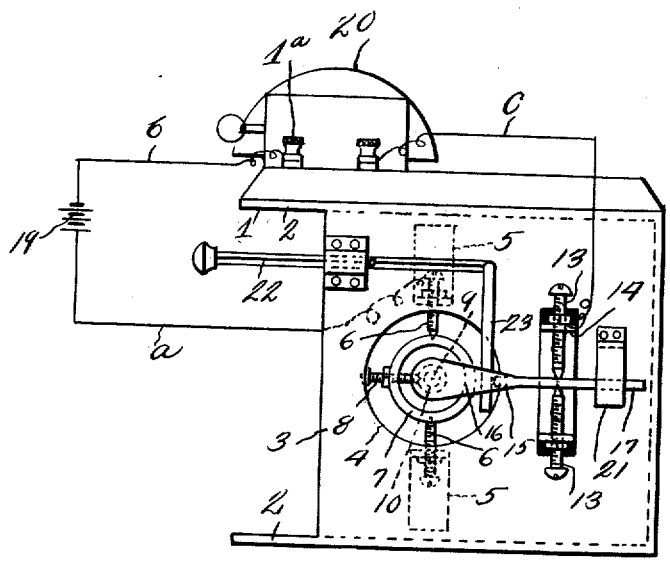
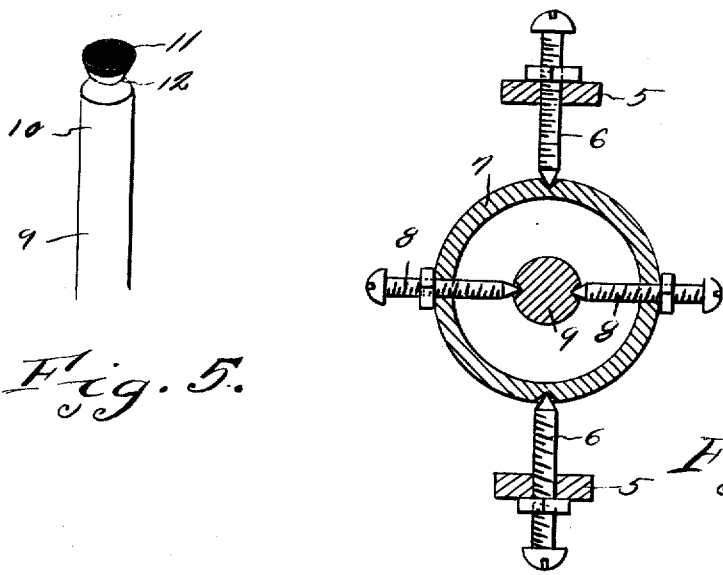
Inventor
F. C. Potter

UNITED STATES PATENT OFFICE.

FREDERICK C. POTTER, OF OMAHA, NEBRASKA.

CIRCUIT-CLOSER FOR VEHICLE-ALARMS.

1,340,344. Specification of Letters Patent. Patented May 18, 1920.

Application filed June 7, 1919. Serial No. 302,625.

*To all whom it may concern:*

Be it known that I, FREDERICK C. POTTER, a citizen of the United States, residing at Omaha, in the county of Douglas and State of Nebraska, have invented certain new and useful Improvements in Circuit-Closers for Vehicle-Alarms, of which the following is a specification, reference being had therein to the accompanying drawing.

The invention relates to alarms and has for its object to provide an electric alarm so constructed that when a vehicle or automobile is moved by an unauthorized person, the movement of the vehicle will cause the closing of an electric circuit, which circuit will ring a bell, thereby warning persons that a vehicle is being stolen.

A further object is to provide a vehicle alarm, which vehicle alarm is controlled by the movement of the vehicle, said movement causing the swinging of a pendulum and means coöperating with said pendulum for closing an electric circuit.

With the above and other objects in view the invention resides in the combination and arrangement of parts as hereinafter set forth shown in the drawings, described and claimed, it being understood that changes in the precise embodiment of the invention may be made within the scope of what is claimed without departing from the spirit of the invention.

In the drawings:—

Fig. 3 is a top plan view.

Fig. 4 is a sectional view taken on line 4—4 of Fig. 1.

Fig. 5 is a perspective view of the upper end of the pendulum.

Figure 1:
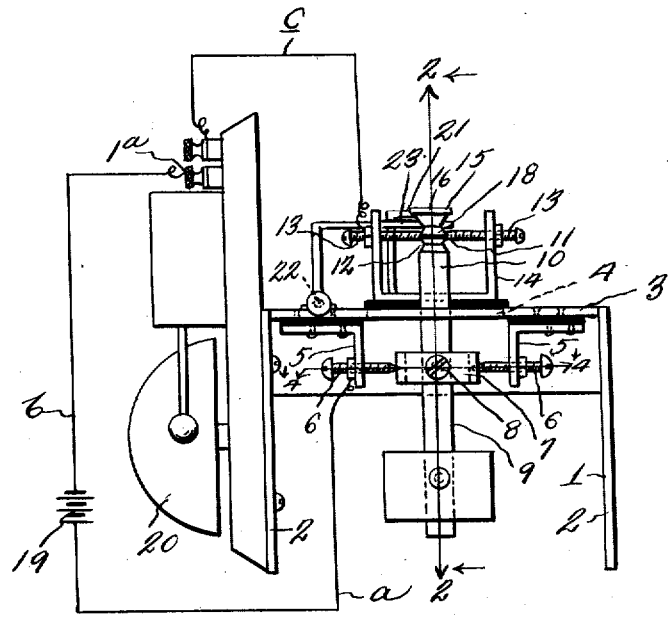
Figure 1 is a front elevation of the alarm and actuating mechanism.
Figure 2:
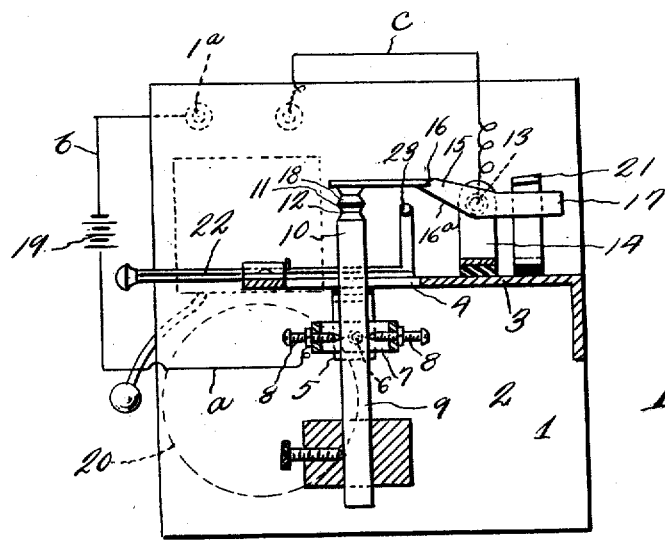
Fig. 2 is a vertical sectional view taken on line 2—2 of Fig. 1.

Referring to the drawings, the numeral 1 designates a U-shaped plate, said plate comprising the vertical side members 2 and the horizontal member 3. A centrally disposed opening 4 is provided in the horizontal plate 3 and secured to the marginal edge of said opening at diametrically opposite sides thereof and on the under face of said members are depending arms 5, said arms having threaded therein screws 6, said screws forming pintles for a ring 7. Threaded through the ring 7 at diametrically opposite points are screws 8, said screws being at right angles to the screws 6 and the points of which are adapted to form pintles for the pendulum, the lower end of said pendulum being provided with a weight to facilitate the swinging of the same. It will be seen that the pendulum is supported in a universal bearing and no matter in what direction the vehicle to which said alarm is moved, said pendulum will freely swing. The upper end 10 of the pendulum extends upwardly through the opening 4 and has its upper end 10 provided with insulation 11, said upper end is also provided with an annular groove 12, the purpose of which will presently appear.

Pivoted at 13, on a bracket 14 is a lever 15, said lever comprising the arms 16 and 17. The arm 16 is heavier than the arm 17, therefore by means of the weight of said arm 16, the contact lug 18 is normally maintained in contact with the insulation 11, on the upper end of the pendulum 9 and the electric circuit broken. The electric circuit comprises a battery 19, one wire $a$ of which battery is connected to the screw 6, while the other wire $b$ of said battery leads to and is connected to a binding post 1ª of the bell 20, there being a wire $c$ connected to a binding post of the bell and to one of the screws 13.

The operation is as follows, when the vehicle is moved by an unauthorized person, the weighted pendulum will be caused to swing, which swinging action will cause the upper end of the pendulum to move out of contact with the contact lug 18 of the lever 15. Arm 16 of said lever 15 being heavier than the arm 17 will cause the contact 18 to drop below the upper end of the pendulum and off of the insulation 11, and into contact with the annular groove 12, thereby closing the circuit between the battery and the bell and causing the bell to ring continuously until the mechanism is again set. The downward movement of the arm 16, of the lever 15 is limited by the contact of the arm 17 with the limiting stop 21.

When it is desired to throw the mechanism out of operation the slidable arm 22 is moved so that the arm 23 thereof will engage under the inclined portion 16ª of the arm 16 of the lever 15, thereby holding the said lever arm in raised position.

The invention having been set forth what is claimed as new and useful is:—

1. A circuit closer comprising a support, said support having a pendulum supported in a universal joint thereon, the upper end of said pendulum being provided with insulation, a pivoted lever carried by said support and having a contact point at its end, said contact point being normally disposed on the insulation on the upper end of the pendulum and held in contact with said insulation by the weight thereof, said pendulum being adapted to be swung in any direction when the circuit closer is moved thereby allowing the contact point to drop below the insulation and contact with the pendulum.

2. A circuit closer comprising a support, said support having a pendulum supported in a universal joint carried by said support, the upper end of said pendulum being provided with insulation, an annular groove in said pendulum below the insulation, a pivoted lever carried by said support and having a flanged contact point at its end, said contact being normally disposed on the insulation of the pendulum and held there by the weight of the pivoted lever, said pendulum being adapted to be swung by the movement of the circuit closer thereby allowing the flanged contact point to drop and engage the annular groove of the pendulum and means whereby the downward movement of the pivoted lever will be limited.

3. A circuit closer comprising a pivoted and universally supported pendulum, a pivoted lever, the free end of said lever engaging and being normally insulated from the pendulum, said universal supporting of the pendulum allowing the pivoted lever to drop below the insulating means between the pendulum and the lever and contact with said lever when the circuit closer is moved.

In testimony whereof I hereunto affix my signature.

FREDERICK C. POTTER.